Dec. 29, 1936.  J. A. KINNARD  2,065,812
THERMOSTATIC VALVE
Original Filed May 8, 1935

INVENTOR.
James A. Kinnard
BY
Everett G. Wright
ATTORNEY.

Patented Dec. 29, 1936

2,065,812

UNITED STATES PATENT OFFICE 2,065,812

THERMOSTATIC VALVE

James A. Kinnard, Detroit, Mich.

Application May 8, 1935, Serial No. 20,308
Renewed April 20, 1936

16 Claims. (Cl. 236—34)

This invention relates to thermostatic valves of the butterfly type and in particular to temperature responsive devices used for controlling the circulation of the cooling fluid in the cooling system of automotive engines and the like.

One object of this invention is to provide a thermostatic valve assembly preferably adapted to be operatingly located within a flexible connection between an internal combustion engine and the radiator of its cooling system, the valve thereof being actuated by a fluid filled bellows type temperature responsive element mounted thereon in such a manner as to cause a positive pivotal movement of the said valve, and at the same time cause a minimum obstruction to the flow of cooling fluid therethrough when said valve is in its open position.

Another object of this invention is to provide a thermostatic valve assembly having its pivoted valve and temperature responsive element streamlined to cause a minimum obstruction to the flow of cooling fluid therethrough when said valve is in its open position.

Another object of this invention is to provide a thermostatic valve assembly in which the thermostatic element and the pivoted or butterfly valve thereof are an integral unit.

Another object of this invention is to provide a thermostatic valve having the bellows type thermostatic element thereof located eccentric to its pivotal mounting and adapted to react against a movable fulcrum in such a manner as to permit the power stroke of the said thermostatic element to be always normal to the face of the valve.

Another object of this invention is to provide a thermostatic valve having the bellows type thermostatic element thereof located eccentric to its pivotal mounting and adapted to react against a floating fulcrum to cause the power stroke of the said thermostatic element to act at all times tangential to the arcuate path of the bellows.

Another object of this invention is to provide a thermostatic valve having the bellows type thermostatic element thereof located eccentric to its pivotal mounting and adapted to open and close said valve responsive to the said thermostatic element without the use of springs or the like for urging the said valve to its closed position.

Another object of this invention is to provide a thermostatic valve assembly having a bellows type thermostatic element integral with or mounted on the pivoted butterfly valve thereof which is light in weight, compactly constructed of comparatively few simple parts, and economical to manufacture.

Other objects of the invention will become apparent by reference to the following detailed description taken in connection with the accompanying drawing, in which.

Figure 1:
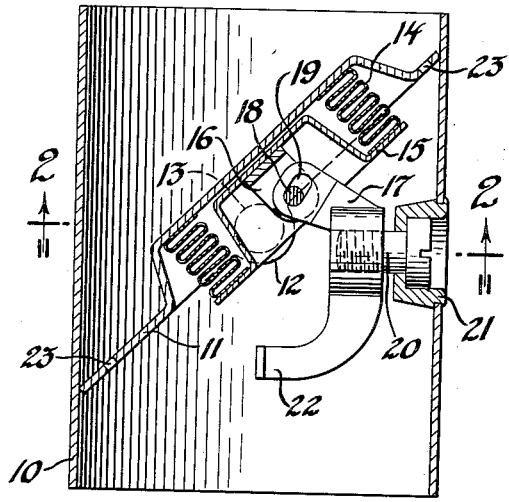
Fig. 1 is a longitudinal sectional view of a thermostatic valve assembly embodying the invention, the pivoted butterfly valve thereof being shown in its closed position.
Figure 2:
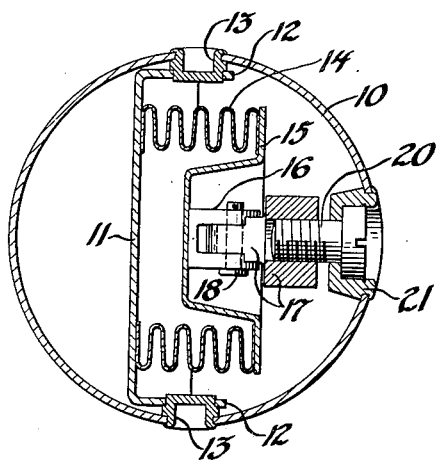
Fig. 2 is a cross sectional view taken on line 2—2 of Fig. 1 with the valve shown in its open position.

Referring particularly to the drawing wherein like numerals refer to like and corresponding parts throughout the several views, the thermostatic valve shown in Fig. 1 and Fig. 2 comprises a tubular housing or casing 10 having a butterfly type valve member 11 pivoted therein. Preferably, the valve member 11 is formed with a pair of oppositely disposed integral lugs 12 having suitably located apertures therein through which shouldered bearings 13 pivotally support the said valve member 11 from diametrically opposite sides of the tubular housing or casing 10. The said shouldered bearings 13 may be secured to the casing 10 by peening or rolling the same into engagement therewith.

The valve member 11 is provided with a substantially annular dished or depressed portion eccentric to its pivotal mounting which serves as the base of a thermostatic element or bellows 14 and serves to streamline the same. The movable end 15 of the bellows 14 is also dished to accommodate a U-shaped bracket 16 suitably secured thereto. The bellows 14 is preferably pivotally floated on an adjustable fulcrum 17 by means of the pivot pin 18 extending through the U-shaped bracket 16 and the suitably located slotted hole 19 of the said adjustable fulcrum 17.

The adjustable fulcrum 17 is threaded on the adjusting screw 20 which is journaled in the cup 21. The cup 21 is shouldered at its outer end to permit the same to be secured to the casing 10 by peening or rolling the same into engagement therewith. The adjusting screw 20 snugly fits the cup 21 and may be held in its adjusted position after assembly by deforming the same with a suitable set or punch. A stop 22 preferably integral with the adjustable fulcrum 17 limits the movement of the valve member 11 to its open position.

The valve member 11 is also provided with one or more suitably disposed and sized apertures 23 through which a small amount of cooling fluid passes for the purpose of maintaining a slight circulation of cooling fluid in the cooling system regulated by the valve when the valve is closed. The slight circulation of cooling fluid from the engine through the valve when the valve is closed permits a quick response by the thermostatic element thereof to slight temperature changes of the cooling fluid in the engine. The size and location of the apertures 23 in the valve member 11 may also be used to properly balance the valve member 11 when closed against the pressure of the cooling fluid where the cooling fluid is under forced circulation.

Figure 3:
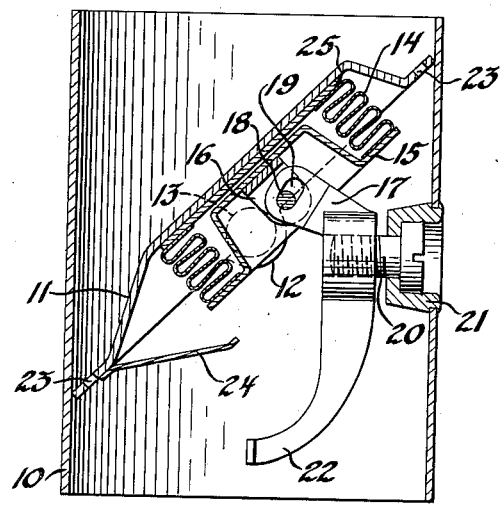
Fig. 3 is a longitudinal sectional view similar to Fig. 1 indicating another embodiment of the invention.

In the embodiment shown in Fig. 3, the valve member 11 is streamlined and is provided with a baffle 24 for directing cooling fluid around the bellows 14 when the valve is in its opened position. However, the baffle 24 does not prevent the cooling fluid from contacting the bellows 14 at all times, it being the function of the streamlined valve member 11 and the baffle 24 to reduce the resistance to the flow of cooling fluid through the valve assembly to a minimum.

In the embodiment shown in Fig. 3, the bellows 14 is indicated as a unit having a base 25 and a movable end 15. The base 25 of the bellows 14 may be secured to the streamlined valve member 11 by any suitable means such as soldering or sweating.

In both embodiments shown in the drawing, it is desirable and preferable to charge the bellows 14 in a manner such as will cause it to be normally under a vacuum so that in the event of leakage the bellows 14 will expand due to the loss of its vacuum and open the valve member 11 to a position of safety.

After assembling the thermostatic valve the pivoted butterfly valve member 11 is placed in its closed position as shown in Fig. 1 and Fig. 3 and the fulcrum 17 is adjusted to its proper position as indicated in the drawing while the valve assembly is maintained at its maximum temperature for its closed position, say 140 degrees. The fulcrum adjusting screw is then set in its adjusted position.

The thermostatic valve assembly may then be placed in a flexible connection between an automotive or other internal combustion engine and the radiator of its cooling system. When the cooling fluid in the engine is cold and the valve 11 remains closed, however, a slight circulation of cooling fluid is permitted through apertures 23 in the valve 11 until the temperature of the cooling fluid from the engine exceeds a predetermined minimum of say 140 degrees. As the temperature of the cooling fluid increases above 140 degrees the thermostatic element 14 expands and urges the valve 11 to its open position by acting against the fulcrum 17. After the valve 11 has been thus opened, it automatically closes by the force of the contraction of the thermostatic element 14 as the temperature of the cooling fluid decreases to 140 degrees.

As hereinbefore described the base of the thermostatic element or bellows 14 is eccentrically mounted on the pivoted butterfly valve 11, and the movable end of the said bellows is pivotally floated on the fulcrum 17 by means of a U-shaped bracket 16 and a pin 18 cooperating with the said fulcrum 17 through a suitably located slotted hole 19 therein.

This slotted hole 19 in the fulcrum 17 is so located as to permit the pivot pin 18 to slide along the long side of the said slotted hole 19 as the bellows 14 expands and causes the butterfly valve 11 to turn toward and to its open position. In sliding along the long side of the said slotted hole 19 of the fulcrum 17 the pivot pin 18 locates itself so that the power stroke of the bellows 14 reacting against the fulcrum 17 is always tangential to the arcuate path of the bellows. The pivot pin 18 creeps along the slotted hole 19 as the bellows 14 contracts and pulls the butterfly valve 11 toward and to its closed position by cooperating with the fulcrum 17, the pivot pin 18 thereby locates itself so that the power stroke of the bellows 14 pulling against the fulcrum 17 is always tangential to the arcuate path of the bellows. The above permits the use of a comparatively small bellows inasmuch as the full power stroke thereof is directly utilized to move the valve from any position.

It will be noted that the mounting of the bellows is such that no springs or means other than the bellows itself is required to close the valve once it has been opened.

The valve 11 in Fig. 1, being dished approximately half the height of the bellows 14 when expanded, having the said bellows mounted in the depressed portion thereof provides a substantially streamlined unit, however, the further streamlining indicated on the embodiment shown in Fig. 3 may be desirable when an extremely large volume of cooling fluid is required to pass through a comparatively small thermostatic valve. The streamlining and location of the bellows with its corrugations parallel to the flow of cooling fluid through the valve makes the valve self cleaning as well as capable of offering a minimum resistance to the flow of cooling fluid therethrough.

Although but two specific embodiments of this invention have been shown and described herein, it will be understood that various changes including the size, shape, arrangement and details of the various parts thereof may be made without departing from the spirit of my invention and it is not intended to limit the scope thereof other than by the terms of the appended claims.

I claim:

1. A thermostatic valve comprising a housing, a butterfly valve pivoted in said housing, a bellows type thermostatic element integral with said valve and normal thereto, said bellows located eccentric to said pivotal valve mounting, said valve being dished to a depth of approximately half the height of said bellows when expanded for streamlining said valve, a baffle on said valve for streamlining the same substantially symmetrical to its pivotal mounting, and means for causing the power stroke of the thermostatic element to act tangential to the arcuate path described by the said thermostatic element when opening and closing said valve.

2. In a thermostatic valve assembly, a tubular housing, a valve element pivoted within said tubular housing, a bellows type thermostatic element mounted on said valve normal thereto and eccentric to its pivotal mounting adapted to open and close said valve, the said valve being dished to a depth of approximately half the height of said bellows when expanded for streamlining the said valve, and a baffle on said valve for streamlining the same substantially symmetrical to its pivotal mounting.

3. A thermostatic valve comprising a tubular housing, a valve element pivoted within said housing, a bellows type thermostatic element mounted on said valve normal thereto and in a dished portion thereof eccentric to its pivotal mounting, the said bellows adapted to open and close said valve, and a baffle on said valve for streamlining the same substantially symmetrical to its pivotal mounting.

4. A thermostatic valve comprising a housing, diametrically opposed shouldered bearings secured within said housing, a valve element having oppositely disposed shouldered lugs integral therewith for pivoting the same on said shouldered bearings, a bellows type thermostatic element mounted on said valve normal thereto and in a dished portion thereof eccentric to its pivotal mounting, the said bellows adapted to open and close said valve, and a baffle on said valve for streamlining the same substantially symmetrical to its pivotal mounting.

5. A thermostatic valve comprising a tubular housing, a valve element pivoted within said housing, a bellows type thermostatic element mounted on said valve normal thereto and in a dished portion thereof eccentric to its pivotal mounting, an adjustable fulcrum within said housing, and means for floatingly pivoting said bellows on said fulcrum to cause the same to open and close said valve.

6. A thermostatic valve comprising a tubular housing, a valve element pivoted within said housing, a bellows type thermostatic element mounted on said valve normal thereto and in a dished portion thereof eccentric to its pivotal mounting, and an adjustable fulcrum within said housing, the said fulcrum having a slotted hole therein through which the said bellows is floatingly pivoted to permit the same to open and close said valve.

7. A thermostatic valve comprising a tubular housing, a valve element pivoted within said housing, a bellows type thermostatic element integral with said valve normal thereto and in a dished portion thereof eccentric to its pivotal mounting, a baffle on said valve for streamlining the same substantially symmetrical to its pivotal mounting, and an adjustable fulcrum within said housing, the said fulcrum having a slotted hole therein through which the said bellows is floatingly pivoted to permit the same to open and close said valve.

8. A thermostatic valve comprising a tubular housing, a valve element pivoted within said housing, a bellows type thermostatic element mounted on said valve normal thereto and in a dished portion thereof eccentric to its pivotal mounting, and an adjustable fulcrum within said housing, the said fulcrum having a slotted hole therein through which the said bellows is floatingly pivoted to permit the same to open and close said valve by utilizing its full power stroke normal to said valve at all positions thereof.

9. A thermostatic valve comprising a tubular housing, a valve element pivoted within said housing, a bellows type thermostatic element integral with said valve normal thereto and in a dished portion thereof eccentric to its pivotal mounting, a baffle on said valve for streamlining the same substantially symmetrical to its pivotal mounting, and an adjustable fulcrum within said housing, the said fulcrum having a slotted hole therein through which the said bellows is floatingly pivoted to permit the same to open and close said valve by utilizing its full power stroke normal to said valve at all positions thereof.

10. A thermostatic valve comprising a tubular housing, a valve element pivoted within said housing, a bellows type thermostatic element mounted on said valve normal thereto and in a dished portion thereof eccentric to its pivotal mounting, the said bellows adapted to open and close said valve by utilizing its full power stroke normal to said valve at all positions thereof, and a baffle on said valve for streamlining the same substantially symmetrical to its pivotal mounting.

11. In a temperature regulator for the cooling system of an internal combustion engine, the combination of a housing, a valve member adapted to substantially close the passage through said housing and pivotally mounted in said housing for movement about its axis into a position to permit flow of fluid through said housing, said pivoted valve member being recessed to provide a cavity to receive a thermostat, a thermostat adapted to close said valve by a tensional action when contracted and open said valve by a compressive action when expanded mounted partly within the cavity of said recess and attached at one end to said valve member, and means pivotally connecting the opposite end of said thermostat to a fulcrum secured on the wall of said housing laterally of the axis of said valve member.

12. In a temperature regulator for the cooling system of an internal combustion engine, the combination of a housing and a thermostatically operated valve mechanism pivotally mounted in said housing for opening and closing the passage therethrough, said thermostatically operated valve mechanism including a valve member pivoted in the wall of said housing and adapted to move about its pivot to open and close the passage through said housing, said valve member being recessed to provide a cavity to receive a thermostat, and a thermostat adapted to close said valve by a tensional action when contracted and open said valve by a compressive action when expanded partly enclosed in the cavity of said valve member and connected to said valve member to react thereon along a line which is transverse of but laterally disposed with respect to the axis of said valve member, said thermostat having a pivotal connection which is secured to the wall of said housing at a point which is laterally disposed with respect to the axis of said valve member.

13. In a temperature regulator for the cooling system of an internal combustion engine, the combination of a housing, a valve member pivotally mounted therein to open and close the passage through said housing, said valve member being recessed to provide a cavity to receive a thermostat, a fulcrum member mounted on the wall of said housing laterally of the pivotal mounting of said valve member, and a thermostat adapted to close said valve by a tensional action when contracted and open said valve by a compressive action when expanded attached at one end to said valve member and pivotally mounted at its opposite end on said fulcrum member, said thermostat being partly housed in the cavity of said valve member.

14. In a temperature regulator for the cooling system of an internal combustion engine, the combination of a housing, a valve member, means pivotally mounting said valve member in said housing to open and close the passage through said housing, said valve member being recessed to provide a cavity to receive a thermostat, a bellows thermostat adapted to close said valve by a tensional action when contracted and open said valve by a compressive action when expanded attached at one end to said valve member and partly housed in said cavity, and a fulcrum member mounted on the wall of said housing laterally of the pivotal mounting of said valve member and pivotally connected to the opposite end of said thermostat, the axis of said thermostat being transverse of but laterally disposed with respect to the axis of said valve member.

15. In a temperature regulator for the cooling system of an internal combustion engine, the combination of a housing, a valve member adapted to substantially close the passage through said housing and pivotally mounted in said housing for movement about its axis into a position to permit flow of liquid through said housing, said pivoted valve member being recessed to provide a cavity to receive a temperature response means, a temperature responsive means for pivoting said valve member to open and close the passage through said housing adapted to close said valve by a tensional action when contracted and open said valve by a compressive action when expanded mounted partly within the cavity of said recess and attached at one end to said valve member, and means pivotally connecting the opposite end of said temperature responsive means to a fulcrum secured on the wall of said housing laterally of the axis of said valve member.

16. In a temperature regulator for the cooling system of an internal combustion engine, the combination of a housing, a valve member pivotally mounted therein to open and close the passage through said housing, said valve member being recessed to provide a cavity to receive a thermostat, a fulcrum member mounted on the wall of said housing laterally of the pivotal mounting of said valve member, and thermostatic means adapted to close said valve by a tensional action when contracted and open said valve by a compressive action when expanded attached at one end to said valve member and pivotally mounted at its opposite end on said fulcrum member, said thermostat being partly housed in the cavity of said valve member.

JAMES A. KINNARD.